(12) United States Patent
Du et al.

(10) Patent No.: US 11,215,745 B1
(45) Date of Patent: Jan. 4, 2022

(54) BACK LIGHT UNIT AND DISPLAY DEVICE

(71) Applicants: BEIJING BOE OPTOELECTRONICS TECHNOLOGY CO., LTD., Beijing (CN); BOE Technology Group Co., Ltd., Beijing (CN)

(72) Inventors: Jingjun Du, Beijing (CN); Fei Liang, Beijing (CN); Chaoyue Zhao, Beijing (CN); Lingyu Sun, Beijing (CN); Xiuyun Chen, Beijing (CN); Tingxiu Hou, Beijing (CN); Peng Zhong, Beijing (CN); Jian Zhao, Beijing (CN); Yongkang Xiao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/220,946

(22) Filed: Apr. 2, 2021

(30) Foreign Application Priority Data

Sep. 8, 2020 (CN) .......................... 202021948695.3

(51) Int. Cl.
*G02B 6/42* (2006.01)
*F21V 8/00* (2006.01)

(52) U.S. Cl.
CPC ........... *G02B 6/002* (2013.01); *G02B 6/0038* (2013.01); *G02B 6/0051* (2013.01); *G02B 6/0053* (2013.01); *G02B 6/0055* (2013.01); *G02B 6/0068* (2013.01); *G02B 6/0091* (2013.01)

(58) Field of Classification Search
CPC .... G02B 6/0016; G02B 6/0038; G02B 6/002; G02B 6/0091; G02B 6/0051; G02B 6/0053; G02B 6/0068
USPC ........................................................ 362/607
See application file for complete search history.

(56) References Cited

U.S. PATENT DOCUMENTS

| 9,028,124 | B2 * | 5/2015 | Tseng | G02B 6/0016 |
| | | | | 362/608 |
| 2004/0207775 | A1 * | 10/2004 | Min | G02B 6/0018 |
| | | | | 349/65 |
| 2015/0049506 | A1 * | 2/2015 | Lee | G02B 6/002 |
| | | | | 362/608 |
| 2015/0234225 | A1 * | 8/2015 | Yu | G02F 1/133308 |
| | | | | 349/58 |

* cited by examiner

*Primary Examiner* — Karabi Guharay
(74) *Attorney, Agent, or Firm* — Ling Wu; Stephen Wang; Ling and Yang Intellectual Property

(57) ABSTRACT

A back light unit and a display device are proposed. The back light unit includes a light guide plate and multiple light emitting diodes, wherein the multiple light emitting diodes are disposed on a light entrance surface of a side end of the light guide plate, the light entrance surface of the light guide plate is disposed with at least one groove, and the at least one groove is disposed between at least part of adjacent light emitting diodes.

18 Claims, 7 Drawing Sheets

BACK LIGHT UNIT AND DISPLAY DEVICE

CROSS-REFERENCE TO RELATED APPLICATION

The present application claims the priority of Chinese Patent Application No. 202021948695.3 filed to the CNIPA on Sep. 8, 2020, the content of which is incorporated herein by reference.

TECHNICAL FIELD

Embodiments of the present disclosure relate to, but are not limited to the field of display technology, specifically to a back light unit and a display device.

BACKGROUND

As a tablet display device, Liquid Crystal Displays (LCDs) are widely used in electronic products such as mobile phones, notebook computers, tablet computers, digital cameras, vehicle-mounted displays or liquid crystal televisions. A main body of the liquid crystal display device includes a liquid crystal panel and a back light unit, wherein a main function of the back light unit is to provide uniform and high-brightness light for the liquid crystal panel, and commonly used linear or point illuminators are converted into surface illuminators with high brightness and uniform distribution through an optical mechanism, so that the liquid crystal panel can display images normally. The back light unit is taken as one of key components of the liquid crystal display device, and its luminous effect will directly affect picture quality of the liquid crystal display device. The back light unit may be applied not only in the liquid crystal display device, but also in a display device that needs back light such as electronic paper, a digital photo frame, or the like.

At present, Light Emitting Diode (LEDs) are widely used as light sources in back light units, and lights emitted by the LEDs are converted into surface light sources after passing through a light guide plate. According to an incident position of the light source, the back light unit may be divided into two types: side-entrance type and straight down type. For the side-entrance type back light unit, multiple LEDs are disposed on a side face of the light guide plate at intervals. Since lights emitted by a single LED are mainly concentrated within a certain angle, there are fewer lights in a light guide plate area between the adjacent LEDs, resulting in poorer overall light emission uniformity of the light guide plate. In addition, when the LEDs are closer from a visible area of the light guide plate, poorer overall light emission uniformity of the light guide plate is also caused.

SUMMARY

The following is a summary of the subject matter described in detail in embodiments of the present disclosure. This summary is not intended to limit the protection scope of the claims.

An embodiment of the present disclosure provides a back light unit, including: a light guide plate and multiple light emitting diodes. The multiple light emitting diodes are disposed on a light entrance surface of a side end of the light guide plate, the light entrance surface of the light guide plate is disposed with at least one groove, and the at least one groove is disposed between at least part of adjacent light emitting diodes.

In an exemplary embodiment, in a direction parallel to a light exit surface of the light guide plate, a cross-sectional shape of the groove includes any one or more of the following: an arc, a triangle or a trapezoid.

In an exemplary embodiment, when the cross-sectional shape of the groove is the triangle, two sides of the triangle include any one or more of the following: a straight line, a polyline, or an arc line.

In an exemplary embodiment, when the cross-sectional shape of the groove is the trapezoid, two sides of the trapezoid include any one or more of the following: a straight line, a polyline, or an arc line; and an upper bottom of the trapezoid adjacent to a visible area side of the light guide plate includes any one or more of the following: a straight line, a polyline, or an arc line.

In an exemplary embodiment, along an extending direction of the light entrance surface of the light guide plate, a width of the groove is 5 mm to 6 mm; along an extending direction of the light entrance surface of the light guide plate toward the visible area of the light guide plate, a depth of the groove is 0.5 mm to 1.5 mm, and a distance between a center line of the groove and a center line of a light emitting diode adjacent to the groove is 3 mm to 6 mm.

In an exemplary embodiment, when the cross-sectional shape of the groove is an arc, the width of the groove is 5.49 mm, the depth of the groove is 1.05 mm, and the distance between the center line of the groove and the center line of the light emitting diode adjacent to the groove is 5 mm.

In an exemplary embodiment, the cross-sectional shape of the groove is the arc, a radius of the arc is 3.5 mm to 4.5 mm, and at a junction between the arc and the light entrance surface, an included angle between a tangent of the arc and the light entrance surface is 40 degrees to 60 degrees.

In an exemplary embodiment, the radius of the arc is 4.11 mm.

In an exemplary embodiment, the included angle between the tangent of the arc and the light entrance surface is 45 degrees.

In an exemplary embodiment, the cross-sectional shape of the groove is the triangle or the trapezoid, and an included angle between a side of the triangle or the trapezoid and the light entrance surface is 40 degrees to 60 degrees.

In an exemplary embodiment, multiple microstructures are disposed on a groove wall of the at least one groove, wherein the microstructures include micro grooves recessed toward a visual area of the light guide plate and/or micro protrusions protruding away from the visual area of the light guide plate.

In an exemplary embodiment, in a direction parallel to a light exit surface of the light guide plate, cross-sectional shapes of the micro grooves and/or the micro protrusions include any one or more of the following: an arc, a triangle, or a trapezoid, a depth of the micro grooves or a height of the micro protrusions is 10 μm to 100 μm, and an arrangement cycle is 50 μm to 400 μm.

In an exemplary embodiment, a chamfer structure is further disposed between the light entrance surface of the light guide plate and a side end face of the light guide plate adjacent to the light entrance surface, wherein a first end of the chamfer structure is connected with the light entrance surface, and a second end of the chamfer structure is connected with the side end face of the light guide plate adjacent to the light entrance surface, a wedge-shaped surface is formed between the light entrance surface and the side end face.

In an exemplary embodiment, in a direction parallel to a light exit surface of the light guide plate, a cross-sectional shape of the wedge-shaped surface includes any one or more of the following: a straight line, a polyline, or an arc line.

In an exemplary embodiment, the light guide plate is disposed with at least two chamfer structures, wherein at least one chamfer structure is disposed at a first end of the light entrance surface away from the multiple light emitting diodes, and at least one chamfer structure is disposed at a second end of the light entrance surface away from the multiple light emitting diodes.

In an exemplary embodiment, the back light unit further includes a mold frame, wherein a first bump and an accommodation recess are disposed on a frame of the mold frame corresponding to the light entrance surface, the first bump is disposed within a groove of the light guide plate, and the light emitting diode is disposed within the accommodation recess.

In an exemplary embodiment, the frame is further disposed with a second bump, wherein a position of the second bump corresponds to that of a chamfer structure on the light guide plate, and when the light guide plate is disposed within an accommodation cavity of the mold frame, the second bump is matched with the chamfer structure, and an outer surface of the second bump fits a wedge-shaped surface of the chamfer structure.

In an exemplary embodiment, the back light unit further includes a back plate and an optical film set, wherein, the back plate includes a bottom plate and a side wall positioned at an edge of the bottom plate and perpendicular to the bottom plate, the bottom plate is disposed with a reflective film, and the light guide plate is disposed on the reflective film; and the optical film set is disposed on light guide plate, and the optical film set includes a diffusion film disposed on the light guide plate, a lower bright enhancement film disposed on the diffusion film and an upper bright enhancement film disposed on the lower bright enhancement film.

In an exemplary embodiment, an outer surface of the first bump facing a visible area of the light guide plate is a polished surface.

An embodiment of the present disclosure also provides a display device, including any of the back light units described above.

Other features and advantages of the present disclosure will be set forth in the following specification, and in part will become apparent from the specification, or be learned by practice of embodiments of the present disclosure. Purposes and other advantages of the technical solutions of the present disclosure may be achieved and acquired by structures specified in the detailed description, claims and drawings.

Other aspects will become apparent upon reading and understanding accompanying drawings and the detailed description.

BRIEF DESCRIPTION OF DRAWINGS

The attached drawings are used to provide a further understanding of technical solutions of embodiments of the present disclosure, and constitute a part of the specification of the present disclosure. They are used together with the embodiments of the present disclosure to explain the technical solutions of the present disclosure, and do not constitute a restriction on the technical solutions of the present disclosure. Shapes and sizes of the components in the drawings do not reflect true proportions and are only to be used to schematically illustrate contents of the present disclosure.

DETAILED DESCRIPTION

Specific implementations of the present disclosure will be described in further detail below with reference to the accompanying drawings and embodiments. The following is used to illustrate the present disclosure, but is not intended to limit the scope of the present disclosure. The embodiments and features in the embodiments in the present disclosure may be combined arbitrarily if there is no conflict.

An embodiment of the present disclosure provides a back light unit. In an exemplary embodiment, the back light unit may include a light guide plate and multiple light emitting diodes, wherein the multiple light emitting diodes are disposed on a light entrance surface of a side end of the light guide plate, the light entrance surface of the light guide plate is disposed with at least one groove, and the at least one groove is disposed between at least part of adjacent light emitting diodes.

In an exemplary embodiment, in a direction parallel to a light exit surface of the light guide plate, a cross-sectional shape of the groove includes any one or more of the following: an arc, a triangle or a trapezoid.

In an exemplary embodiment, multiple microstructures are disposed on a groove wall of the at least one groove, wherein the microstructures include micro grooves recessed toward a visual area of the light guide plate and/or micro protrusions protruding away from the visual area of the light guide plate.

In an exemplary embodiment, a chamfer structure is further disposed between a light entrance surface of the light guide plate and a side end face of the light guide plate adjacent to the light entrance surface, wherein a first end of the chamfer structure is connected with the light entrance surface, and a second end of the chamfer structure is connected with a side end face of the light guide plate adjacent to the light entrance surface, a wedge-shaped surface is formed between the light entrance surface and the side end face. In a direction parallel to a light exit surface of the light guide plate, a cross-sectional shape of the wedge-shaped surface includes any one or more of the following: a straight line, a polyline or an arc line.

In an exemplary embodiment, the back light unit further includes a mold frame, wherein a first bump and an accommodation recess are disposed on a frame of the mold frame corresponding to the light entrance surface, the first bump is disposed within the groove of the light guide plate, and the light emitting diode is disposed within the accommodation recess.

Figure 1:
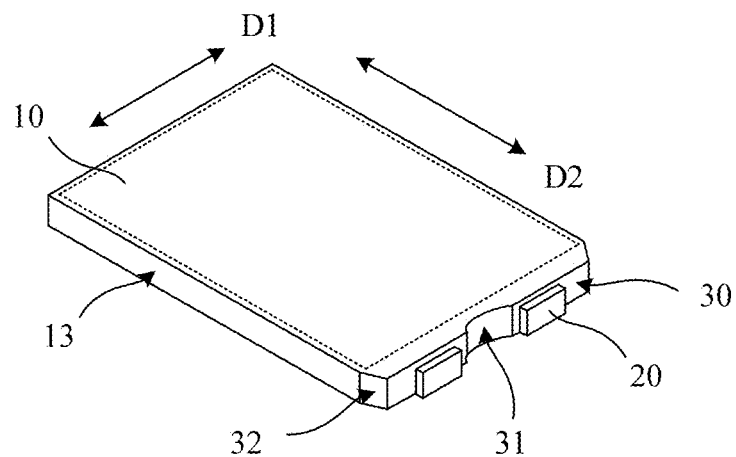
FIG. 1 is a perspective view of a back light unit according to an embodiment of the present disclosure.
Figure 2:
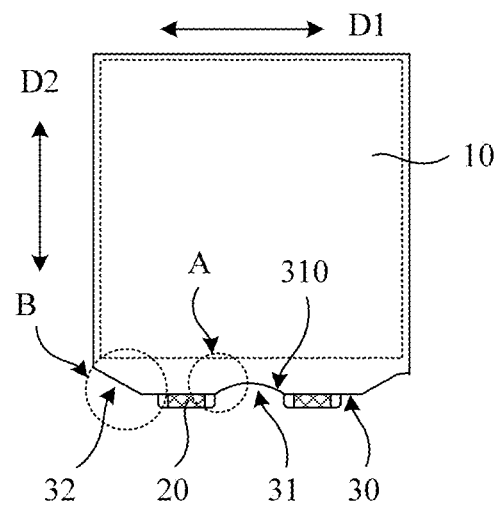
FIG. 2 is a top view of the back light unit shown in FIG. 1.
Figure 3:
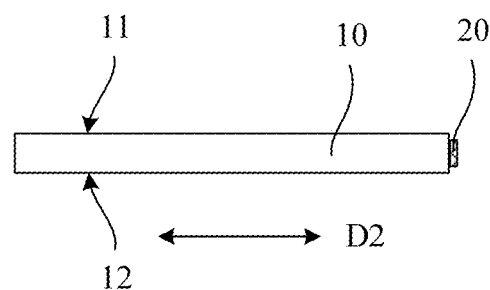
FIG. 3 is a side view of the back light unit shown in FIG. 1.

FIG. 1 is a perspective view of a back light unit according to an embodiment of the present disclosure, FIG. 2 is a top view of the back light unit shown in FIG. 1, and FIG. 3 is a side view of the back light unit shown in FIG. 1. As shown in FIGS. 1 to 3, a main body of a back light unit according to an embodiment of the present disclosure includes a light guide plate 10 and light emitting diodes 20. In an exemplary embodiment, the light guide plate 10 may include a first surface 11, a second surface 12 and third surfaces 13, wherein the planar first surface 11 and the planar second surface 12 are disposed oppositely, multiple strip-shaped third surfaces 13 are positioned at side ends of the first surface 11 and the second surface 12 and connected to the first surface 11 and the second surface 12, and the third surfaces 13 serve as side end faces of the light guide plate 10. In an exemplary embodiment, the first surface 11 may be a light exit surface of the light guide plate 10, the second surface 12 may be a reflective surface of the light guide plate 10, and at least one third surface 13 may be a light entrance surface of the light guide plate 10, that is, the light entrance surface is disposed at a side end of the light guide plate 10. In an exemplary embodiment, the first surface 11 and the second surface 12 may be disposed to be parallel to each other, or may be disposed to be non-parallel, so as to adapt to usage requirements in different back light environments. In an exemplary embodiment, the dashed line boxes in FIGS. 1 and 2 are represented as a visible area, and a position and a dimension of the visible area correspond to those of an active area (AA) in a display panel, and the visible area is configured to output uniform and high-brightness light to the active area.

In an exemplary embodiment, a material of the light guide plate 10 may include any one or more of the following: polycarbonate (PC), polymethylmethacrylate (PMMA), methyl methacrylate-styrene copolymer (MS) or glass. Spray treatment, patterning treatment, texturing treatment, etc. may be performed on the first surface 11 and the second surface 12 of the light guide plate 10, so as to increase light emitting efficiency and uniformity of emitted lights of the light guide plate 10.

In an exemplary embodiment, the light emitting diode 20 has a light exit surface, the light exit surface of the light emitting diode 20 is attached to one or more third surfaces 13 of the light guide plate 10, the third surface(s) 13 on which the light emitting diode 20 is attached is a light entrance surface 30 of the light guide plate 10, and lights emitted by the light emitting diode 20 enter the light guide plate 10 via the light entrance surface 30. In an exemplary embodiment, the light exit surface of the light emitting diode 20 and the light entrance surface 30 of the light guide plate 10 are parallel to each other, wherein a gap between them may be 0 mm. In some exemplary implementations, the gap between the light exit surface of the light emitting diode 20 and the light entrance surface 30 of the light guide plate 10 may be set according to an actual situation of a product, which is not limited in the embodiments of the present disclosure.

In an exemplary embodiment, the light guide plate 10 includes a strip-shaped third surface 13 extending along a first direction D1 and a strip-shaped third surface 13 extending along a second direction D2, wherein the first direction D1 crosses the second direction D2. In some exemplary implementations, the first direction D1 may be perpendicular to the second direction D2. In an exemplary embodiment, the light entrance surface 30 of the light guide plate 10 is one third surface 13 extending along the first direction D1, and multiple light emitting diodes 20 are sequentially disposed on the light entrance surface 30 of the light guide plate 10 along the first direction D1.

Figure 4:
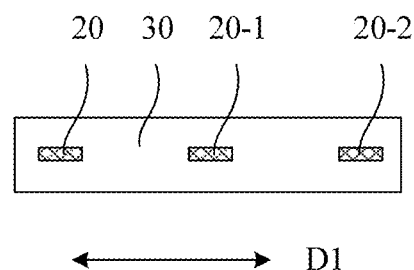
FIG. 4 is a schematic layout diagram of light emitting diodes according to an embodiment of the present disclosure.
Figure 5:
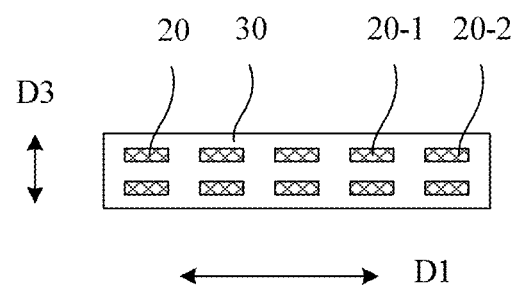
FIG. 5 is another schematic layout diagram of light emitting diodes according to an embodiment of the present disclosure.
Figure 6:
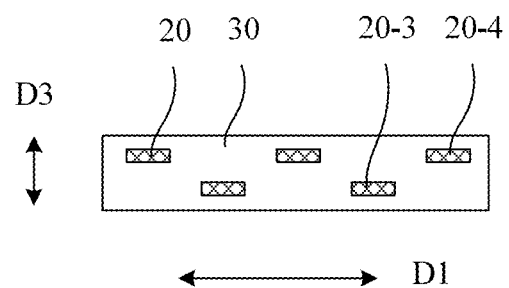
FIG. 6 is still another schematic layout diagram of light emitting diodes according to an embodiment of the present disclosure.

In an exemplary embodiment, various layout modes may be used for multiple light emitting diodes 20 disposed on the light entrance surface 30 of the light guide plate 10. FIG. 4 is a schematic layout diagram of light emitting diodes according to an embodiment of the present disclosure. As shown in FIG. 4, multiple light emitting diodes 20 are sequentially disposed along the first direction D1 to form one light emitting diode row. FIG. 5 is another schematic layout diagram of light emitting diodes according to an embodiment of the present disclosure. As shown in FIG. 5, multiple light emitting diodes 20 are sequentially disposed along the first direction D1 to form one light emitting diode row, and multiple light emitting diode rows are sequentially disposed along a third direction D3, wherein the third direction D3 crosses the first direction D1 and a second direction D2, a light emitting diode array in an array layout is formed. In some exemplary implementations, the third direction D3 may be perpendicular to the first direction D1 and the second direction D2. FIG. 6 is a still another schematic layout diagram of light emitting diodes according to an embodiment of the present disclosure. As shown in FIG. 6, multiple light emitting diodes 20 are sequentially disposed along the first direction D1 to form one light emitting diode row, and multiple light emitting diode rows are sequentially disposed along the third direction D3, wherein the light emitting diodes 20 of the adjacent light emitting diode rows are staggered to form a staggered-layout light emitting diode array. In some exemplary implementations, a layout mode of the light emitting diodes 20 may be set according to an actual situation of a product, which is not limited in the embodiments of the present disclosure.

In an exemplary embodiment, the light entrance surface 30 is disposed with at least one groove 31 recessed toward a visible area of a light guide plate, and at least one groove 31 is disposed between at least part of adjacent light emitting diodes 20. Herein, the adjacent light emitting diodes 20 refer to adjacent light emitting diodes 20 in the first direction D1, that is, along the first direction D1, the grooves 31 and the light emitting diodes 20 are disposed at intervals. For example, for the layout modes shown in FIGS. 4 and 5, the adjacent light emitting diodes 20 refer to light emitting diode 20-1 and light emitting diode 20-2. For the layout mode shown in FIG. 6, the adjacent light emitting diodes 20 refer to light emitting diode 20-3 and light emitting diode 20-4.

In an exemplary embodiment, in a direction parallel to a light exit surface of the light guide plate, a cross-sectional shape of the groove 31 is arc to form an arc-shaped surface 310.

Figure 7:
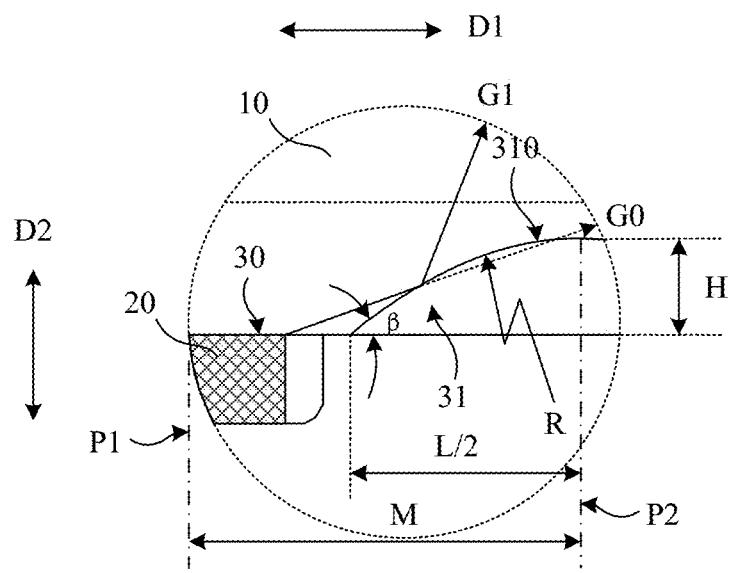
FIG. 7 is a schematic diagram of a structure of a groove according to an embodiment of the present disclosure.

FIG. 7 is a schematic diagram of a structure of a groove according to an embodiment of the present disclosure, which is an enlarged view of area A in FIG. 2. When the light entrance surface 30 of the light guide plate 10 is not disposed with the groove 31, light emitted by the light emitting diode 20 enters the light guide plate 10 and then propagates in a straight line, as shown by a dashed line G0 in FIG. 7. According to the embodiment of the present disclosure, the groove 31 with an arc structure is disposed on the light entrance surface 30 of the light guide plate 10, the groove 31 forms an arc-shaped surface 310 protruding toward the visible area of the light guide plate, after the light emitted by the light emitting diode 20 enters the light guide plate 10, when the light is incident on the arc-shaped surface 310 of the groove 31, the light is totally reflected by the arc-shaped surface 310, so that the transmission direction of the light is changed, and the light propagates according to a polyline, as shown by a solid line G1 in FIG. 7.

Figure 8:
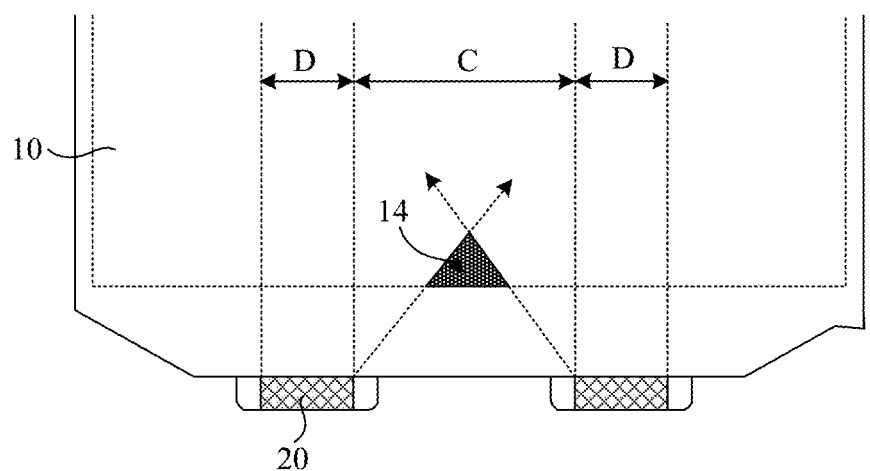
FIG. 8 is a schematic diagram of a light transmission path when a light entrance surface of a light guide plate is not disposed with grooves.

FIG. 8 is a schematic diagram of a light transmission path when a light entrance surface of a light guide plate is not disposed with grooves. As shown in FIG. 8, since a light emitting angle of the light emitting diodes 20 is limited and a light intensity distribution of the light emitting diodes 20 decreases from the center to the periphery, a light intensity distribution between a light guide plate area between adjacent light emitting diodes 20 (area C in FIG. 8) and a light guide plate area directly opposite to the light emitting diodes 20 (area D in FIG. 8) is uneven, resulting in poorer overall light emission uniformity of the light guide plate. In addition, when the light emitting diodes 20 are closer from a visible area of the light guide plate 10 or a distance between the adjacent light emitting diodes 20 is larger, a light guide plate area positioned between the adjacent light emitting diodes 20 may also form a dark area 14.

Figure 9:
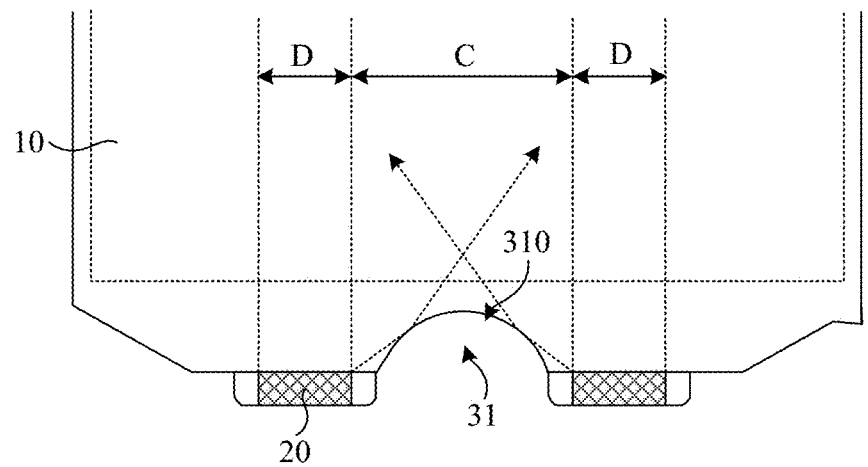
FIG. 9 is a schematic diagram of a light transmission path when a light entrance surface of a light guide plate is disposed with grooves.

FIG. 9 is a schematic diagram of a light transmission path when a light entrance surface of a light guide plate is disposed with grooves. As shown in FIG. 9, a groove 31 is disposed on the light entrance surface of the light guide plate and the groove 31 is positioned between two adjacent light emitting diodes 20, after lights emitted by a light emitting diode 20 enter the light guide plate 10, part of the lights are totally reflected by an arc-shaped surface 310 of the groove, so that the lights are deflected, and the deflected lights are directed to a light guide plate area between the two light emitting diodes 20, which increases brightness of the light guide plate area between the adjacent light emitting diodes 20. Therefore, uneven distribution of light intensity between a light guide plate area between adjacent light emitting diodes 20 (area C in FIG. 9) and a light guide plate area directly opposite to the light emitting diodes 20 (area D in FIG. 9) is reduced, and overall light emitting uniformity of the light guide plate is improved.

In order to avoid the problem of the dark area, at present, a structure adopts a solution of increasing a mixed-light distance, but this solution increases a distance between LED and the visible area of the light guide plate, which leads to increase of non-display area, and is not beneficial to realization of narrow frame and does not conform to the market design trend. In the solution of disposing the groove on the light entrance surface of the light guide plate proposed in the embodiment of the present disclosure, through the groove structure, brightness of the light guide plate area between adjacent LEDs is improved, forming of dark areas is avoided, which can ensure that on the premise of reducing uneven light intensity distribution between the light guide plate area between adjacent LEDs and the light guide plate area directly opposite to the LEDs, a distance between LEDs and the visible area of the light guide plate can be appropriately reduced, so that the non-display area can be reduced, and a dimension of the frame on an LED side in the back light unit can be reduced, which is beneficial to realizing narrow frame, and improving product competitiveness.

In order to avoid the problem of the dark area, at present, another structure adopts a solution of reducing the distance between adjacent LEDs and increasing a quantity of LEDs, but this solution not only causes cost increase of the back light unit, but also causes power consumption increase of the back light unit. In the solution of disposing the groove on the light entrance surface of the light guide plate proposed in the embodiment of the present disclosure, through the groove structure, brightness of the light guide plate area between adjacent LEDs is improved, forming of dark areas is avoided, which can ensure that on the premise of reducing uneven light intensity distribution between the light guide plate area between adjacent LEDs and the light guide plate area directly opposite to the LEDs, the distance between adjacent LEDs can be appropriately increased, and the quantity of LEDs can be reduced, which not only reduces cost of the back light unit, but also can reduce power consumption of the back light unit, improving product competitiveness.

In an exemplary embodiment, by designing a geometric parameter of the arc-shaped surface 310, the lights reflected by the arc-shaped surface 310 may be deflected to a set area, thereby increasing amount of lights entering the set area and increasing the brightness of the set area. In an exemplary embodiment, the set area may be a light guide plate area positioned between the adjacent light emitting diodes 20.

In an exemplary embodiment, in the groove 31 with an arc structure, a width L of the groove 31 may be about 5 mm to 6 mm, a depth H of the groove 31 may be about 0.5 mm to 1.5 mm, a radius R of the arc-shaped surface 310 may be about 3.5 mm to 4.5 mm, a distance M between a center line P2 of the groove 31 and a center line P1 of the adjacent light emitting diode 20 may be about 3 mm to 6 mm, and at a junction between the arc-shaped surface 310 and the light entrance surface 30, an included angle θ between a tangent of the arc-shaped surface 310 and the light entrance surface 30 may be about 40 degrees to 60 degrees. In the embodiment of the present disclosure, the width refers to a characteristic dimension along an extending direction of the light entrance surface of the light guide plate, that is, a characteristic dimension in the first direction D1. The depth or the height refers to a characteristic dimension along an extending direction of the light entrance surface of the light guide plate toward the center of the light guide plate on a plane where the light exit surface of the light guide plate 10 is positioned, that is, a characteristic dimension in the second direction D2. Herein, the arc-shaped surface 310 of the groove 31 and the light entrance surface 30 have two junctions, and the center line P2 of the groove 31 refers to a straight line passing through a middle point between the two junctions and extending along the second direction D2. Herein, the light intensity distribution of the light emitting diode 20 decreases from the center to the periphery, and a position with a maximum light intensity is the center of the light emitting diode 20. The center line P1 of the light emitting diode 20 refers to a straight line passing through the center of the light emitting diode 20 and extending along the second direction D2.

In some exemplary implementations, the width L of the groove 31 may be about 5.49 mm, the depth H of the groove 31 may be about 1.05 mm, the radius R of the arc-shaped surface 310 may be about 4.11 mm, the distance M between the center line P2 of the groove 31 and the center line P1 of the light emitting diode 20 may be about 5 mm, and the included angle β between the tangent of the arc-shaped surface 310 and the light entrance surface 30 may be about 45 degrees.

In an exemplary embodiment, the depth H of the groove 31 is a distance between a vertex of the arc-shaped surface 310 and the light entrance surface 30 in a plane where the light exit surface of the light guide plate 10 is positioned. By adjusting the depth H, a distance between the vertex of the arc-shaped surface 310 and the visible area of the light guide plate 10 may be adjusted, and then the brightness of the light guide plate area between adjacent light emitting diodes 20 may be adjusted. For example, increasing the distance H between the vertex of the arc-shaped surface 310 and the light entrance surface 30 may improve the brightness of the light guide plate area between adjacent light emitting diodes 20.

In an exemplary embodiment, the light entrance surface 30 of the light guide plate 10 may be disposed with multiple light emitting diodes 20 and multiple grooves 31 along the first direction D1, wherein the multiple light emitting diodes 20 are disposed at intervals, the multiple grooves 31 are disposed at intervals, and the grooves 31 are disposed between adjacent light emitting diodes 20 in the first direction D1. In an exemplary embodiment, the light entrance surface 30 between adjacent light emitting diodes 20 may fully be the arc-shaped surface, or may be a plane and an arc-shaped surface, an area adjacent to the light emitting diode 20 is a plane, and an area away from the light emitting diode 20 is an arc-shaped surface. In an exemplary embodiment, the light entrance surface 30 between adjacent grooves 31 is a plane, a width of the plane between the adjacent grooves 31 may be about 8 mm to 12 mm, and the light emitting diodes 20 is disposed in a middle position of the plane. In some exemplary implementations, the width of the plane between the adjacent grooves 31 may be about 10 mm.

In an exemplary embodiment, the light guide plate 10 is further disposed with at least two chamfer structures 32, wherein the at least two chamfer structures 32 are respectively disposed between the light entrance surface 30 and adjacent third surfaces 13, i.e., at least one chamfer structure 32 is disposed at a first end of the light entrance surface 30 away from the multiple light emitting diodes 20, and at least one chamfer structure 32 is disposed at a second end of the light entrance surface 30 away from the multiple light emitting diodes 20. In an exemplary embodiment, the chamfer structures 32 between the light entrance surface 30 and adjacent third surfaces 13 form wedge-shaped surfaces 320.

Figure 10:
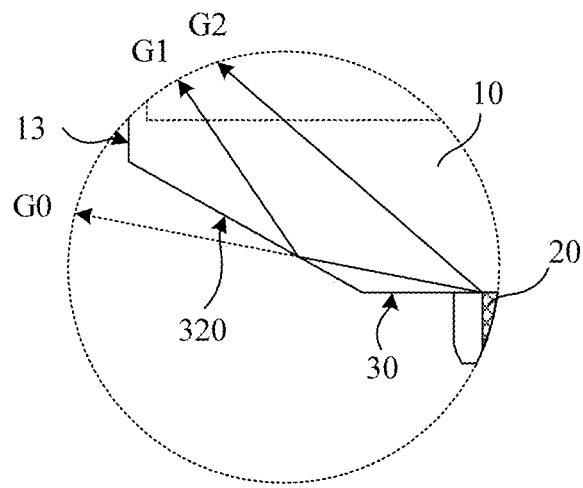
FIG. 10 is a schematic diagram of a structure of a chamfer structure according to an embodiment of the present disclosure.

FIG. 10 is a schematic diagram of a structure of a chamfer structure according to an embodiment of the present disclosure, which is an enlarged view of area B in FIG. 2. As shown in FIG. 10, the chamfering structure 32 is disposed between the light entrance surface 30 and an adjacent third surface 13, wherein a first end of the chamfering structure 32 is connected to the light entrance surface 30 and a second end of the chamfering structure 32 is connected to the third surface 13, a wedge-shaped surface 320 is formed between the light entrance surface 30 and the third surface 13. When the light guide plate 10 is not disposed with the chamfer structure 32, the light emitted by the light emitting diode 20 enters the light guide plate 10 and then propagates in a straight line, as shown by a dashed line G0 in FIG. 10. According to the embodiment of the present disclosure, through disposing the chamfering structures 32 at both ends of the light entrance surface 30 of the light guide plate 10, after the light emitted by the light emitting diode 20 enters the light guide plate 10, when the light is incident on the wedge-shaped surface 320 of the chamfering structure 32, the light is totally reflected by the wedge-shaped surface 320 and propagates according to a polyline, as shown by a solid line G1 in FIG. 10.

In the embodiment of the present disclosure, after the chamfering structure 32 is disposed, light transmission paths at two ends of the light entrance surface 30 mainly include two paths, one is that the light emitted by the light emitting diode 20 enters the light guide plate 10 and then directly enters the visible area, as shown by a solid line G2 in FIG. 10, and the other is that the light emitted by the light emitting diode 20 enters the light guide plate 10 and then undergoes total reflection by the wedge-shaped surface 320 and then enters the visible area, as shown by the solid line G1 in FIG. 10. In this way, the lights emitted to the third surface 13 may be totally reflected, so that utilization efficiency of the light can be improved, and contrast and brightness of a whole picture can be improved.

In an exemplary embodiment, the wedge-shaped surface 320 formed by the chamfering structure 32 may be a plane, a fold surface or an arc surface, that is, the cross-sectional shape of the chamfering structure 32 may be a straight line, a polyline or an arc in a direction parallel to the light exit surface of the light guide plate.

In an exemplary embodiment, a shape and a dimension of the chamfer structure 32 disposed at one end of the light entrance surface 30 may be the same as or different from those of the chamfer structure 32 disposed at the other end of the light entrance surface 30.

In some exemplary implementations, the shape of the chamfering structure 32 at one end of the light entrance surface 30 may be set as a plane, and the shape of the chamfering structure 32 at the other end of the light entrance surface 30 may be set as a fold surface, that is, in a direction parallel to the light exit surface of the light guide plate, the cross-sectional shape of the chamfering structure 32 at one end of the light entrance surface 30 may be a straight line and the cross-sectional shape of the chamfering structure 32 at the other end of the light entrance surface 30 may be a polyline. The shapes of the chamfering structures 32 at two ends of the light entrance surface 30 are set to be different, capable of facilitating identification of the light entrance surface and the light exit surface of the light guide plate to avoid errors in an assembly process.

Figure 11:
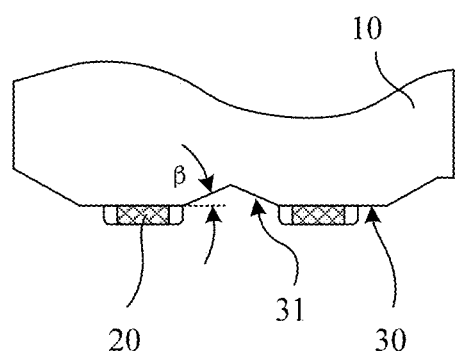
FIG. 11 is a schematic diagram of a structure of another groove according to an embodiment of the present disclosure.

FIG. 11 is a schematic diagram of a structure of another groove according to an embodiment of the present disclosure. In an exemplary embodiment, in a direction parallel to the light exit surface of the light guide plate, the cross-sectional shape of the groove 31 recessed toward the visible area of the light guide plate may be triangle, and an included angle θ between a side of the triangle extending toward the visible area of the light guide plate and the light entrance surface 30 may be about 40 degrees to 60 degrees, as shown in FIG. 11. In some exemplary implementations, two sides of the triangle may be straight lines, or may be polylines, or may be arcs.

Figure 12:
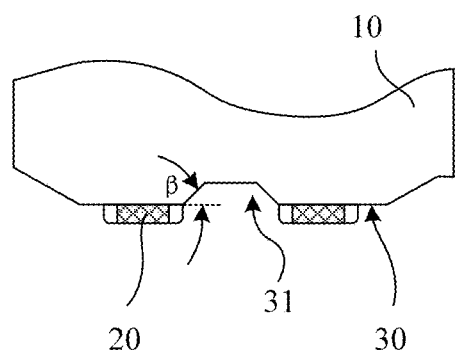
FIG. 12 is a schematic diagram of a structure of still another groove according to an embodiment of the present disclosure.

FIG. 12 is a schematic diagram of a structure of still another groove according to an embodiment of the present disclosure. In an exemplary embodiment, in a direction parallel to the light exit surface of the light guide plate, the cross-sectional shape of the groove 31 recessed toward the visible area of the light guide plate may be trapezoid, and an included angle θ between a side of the trapezoid extending toward the visible area of the light guide plate and the light entrance surface 30 may be about 40 degrees to 60 degrees, as shown in FIG. 12. In an exemplary embodiment, both sides of the trapezoid may be straight lines, or may be polylines, or may be arcs. In some exemplary implementations, an upper bottom of the trapezoid adjacent to a visible area side of the light guide plate may be a straight line, or a polyline, or an arc line.

Figure 13:
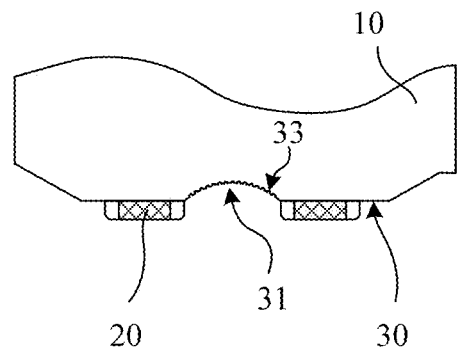
FIG. 13 is a schematic diagram of a structure of still another groove according to an embodiment of the present disclosure.
Figure 14:
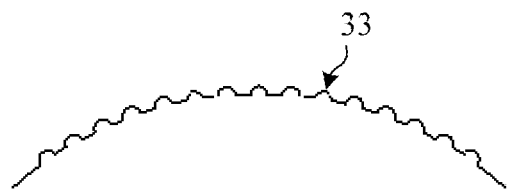
FIG. 14 is a schematic diagram of microstructures disposed on an arc according to an embodiment of the present disclosure.

FIG. 13 is a schematic diagram of a structure of still another groove according to an embodiment of the present disclosure. In an exemplary embodiment, microstructures 33 are disposed on groove wall of grooves 31 recessed toward the visible area of the light guide plate in a direction parallel to a light exit surface of the light guide plate, as shown in FIG. 13. Generally, a dimension on an order of micron may be called the microstructure. FIG. 14 is a schematic diagram of microstructures disposed on an arc according to an embodiment of the present disclosure, which is an enlarged view of the microstructure in FIG. 13. As shown in FIG. 14, in an exemplary embodiment, the cross-sectional shape of the microstructure 33 may be a triangle, trapezoid or arc, etc., and the microstructures 33 are disposed on the arc surface at intervals. The lights are scattered by the microstructures 33, which may further improve brightness of the area between adjacent light emitting diodes 20.

In an exemplary embodiment, the microstructure 33 may be a micro groove or a micro protrusion, which is disposed on a groove wall of the groove 31. That is to say, the light entrance surface 30 is disposed with a groove 31 recessed toward the visible area of the light guide plate, and multiple micro grooves recessed toward the visible area of the light guide plate are disposed on the groove wall of the groove 31; or, the light entrance surface 30 is disposed with a groove 31 recessed toward the visible area of the light guide plate, and multiple micro protrusions protruding away from the visible area of the light guide plate are disposed on the groove wall of the groove 31.

In an exemplary embodiment, in a direction parallel to the light exit surface of the light guide plate, the cross-sectional shape of the groove 31 may be an arc, triangle or trapezoid, the cross-sectional shape of the micro groove or the micro protrusion may also be an arc, triangle or trapezoid, and the shapes of both of the groove 31 and the microstructure 33 may be any one or more combinations thereof. For example, the arc-shaped groove wall of the groove 31 may be disposed with micro grooves or micro protrusions with an arc cross-sectional shape, micro grooves or micro protrusions with a triangle cross-sectional shape, or micro grooves or micro protrusions with a trapezoid cross-sectional shape.

In an exemplary embodiment, the depth of the micro grooves or the height of the micro protrusions may be about 10 μm to 100 μm, and an arrangement cycle may be about 50 μm to 400 μm. Herein, the depth or the height refers to a characteristic dimension along an extending direction of the light entrance surface of the light guide plate toward the center of the light guide plate on a plane where the light exit surface of the light guide plate 10 is positioned, and the arrangement cycle refers to a distance between the center lines of two adjacent micro grooves or micro protrusions.

Figure 15:
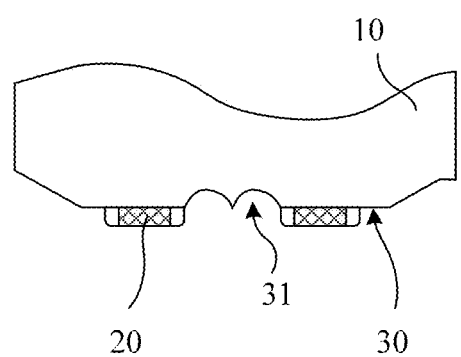
FIG. 15 is a schematic diagram of a structure of still another groove according to an embodiment of the present disclosure.

FIG. 15 is a schematic diagram of a structure of still another groove according to an embodiment of the present disclosure. In an exemplary embodiment, two grooves 31 may be disposed between adjacent light emitting diodes 20, and in a direction parallel to the light exit surface of the light guide plate, the cross-sectional shape of the two grooves 31 may be arc, triangle or trapezoid, as shown in FIG. 15. In some exemplary implementations, multiple grooves 31 may be disposed between adjacent light emitting diodes 20.

Figure 16:
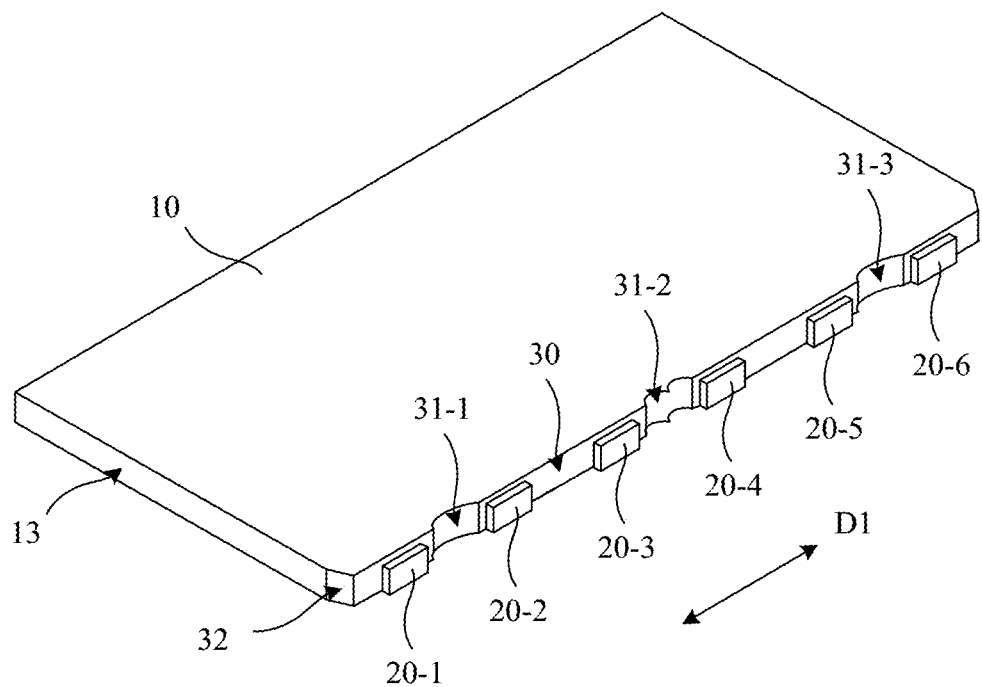
FIG. 16 is a schematic diagram of a structure of another back light unit according to an embodiment of the present disclosure.

FIG. 16 is a schematic diagram of a structure of another back light unit according to an embodiment of the present disclosure. As shown in FIG. 16, in an exemplary embodiment, six light emitting diodes are disposed on the light entrance surface 30 at a side end of the light guide plate 10, wherein the six light emitting diodes include a first light emitting diode 20-1, a second light emitting diode 20-2, a third light emitting diode 20-3, a fourth light emitting diode 20-4, a fifth light emitting diode 20-5 and a sixth light emitting diode 20-6, which are disposed at intervals along an extending direction (the first direction D1) of the light entrance surface 30. Herein, one first groove 31-1 is disposed between the first light emitting diode 20-1 and the second light emitting diode 20-2, two second grooves 31-2 are disposed between the third light emitting diode 20-3 and the fourth light emitting diode 20-4, one third groove 31-3 is disposed between the fifth light emitting diode 20-5 and the sixth light emitting diode 20-6, no groove is disposed between the second light emitting diode 20-2 and the third light emitting diode 20-3, and no groove is disposed between the fourth light emitting diode 20-4 and the fifth light emitting diode 20-5. In an exemplary embodiment, the light guide plate 10 is further disposed with two chamfer structures 32, wherein the two chamfer structures 32 are respectively disposed between the light entrance surface 30 and adjacent third surfaces 13, i.e., one chamfer structure 32 is disposed a first end adjacent to the first light emitting diode 20-1 and the other chamfer structure 32 is disposed a second end adjacent to the sixth light emitting diode 20-6, and a wedge-shaped chamfer structure 32 is formed between the light entrance surface 30 and the third surface 13 adjacent to the light entrance surface 30.

In an exemplary embodiment, distances between adjacent light emitting diodes in the first direction D1 may be same or different; and in a direction parallel to the light exit surface of the light guide plate, cross-sectional shapes and dimensions of the first groove 31-1, the second groove 31-2 and the third groove 31-3 may be same or different. In some exemplary implementations, the first groove 31-1 may be disposed between the second light emitting diode 20-2 and the third light emitting diode 20-3, and the third groove 31-3 may be disposed between the fourth light emitting diode 20-4 and the fifth light emitting diode 20-5. Positions, cross-sectional shapes and dimensions, etc. set for the grooves may be set according to an actual situation of a product, which is not limited in the embodiments of the present disclosure.

Figure 17:
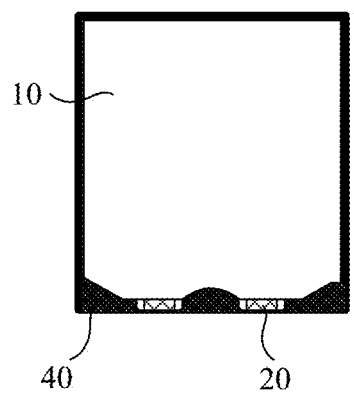
FIG. 17 is a schematic diagram of a structure of still another back light unit according to an embodiment of the present disclosure.

FIG. 17 is a schematic diagram of a structure of still another back light unit according to an embodiment of the present disclosure. As shown in FIG. 17, a main body of the back light unit according to the embodiment of the present disclosure includes a light guide plate 10, light emitting diodes 20 and a mold frame 40, wherein the mold frame 40 is configured to accommodate the light guide plate 10 and together with a back plate to bear a display panel.

Figure 18:
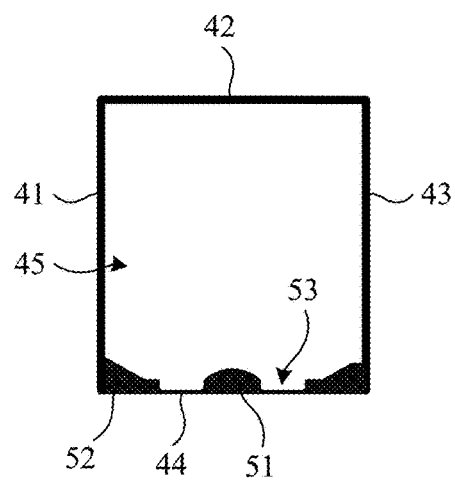
FIG. 18 is a schematic diagram of a structure of a mold frame according to an embodiment of the present disclosure.

FIG. 18 is a schematic diagram of a structure of a mold frame according to an embodiment of the present disclosure. A main body of a mold frame 40 in the embodiment of the present disclosure includes a frame body, and a frame on one side of the frame body is disposed with a first bump, second bumps and accommodation recesses, wherein the first bump is disposed within a groove 31 of the light guide plate 10, the second bumps are matched with chamfer structures 32, and a light emitting diode 20 is disposed within the accommodation recess of the mold frame 40. As shown in FIG. 18, in an exemplary embodiment, the mold frame 40 may be surrounded by a first frame 41, a second frame 42, a third frame 43 and a fourth frame 44, wherein the first frame 41, the second frame 42, the third frame 43 and the fourth frame 44 are connected in sequence, the first frame 41 and the third frame 43 are disposed oppositely, and the second frame 42 and the fourth frame 44 are disposed oppositely. The first frame 41, the second frame 42, the third frame 43 and the fourth frame 44 surround to form an accommodation cavity 45, and the light guide plate 10 is disposed within the accommodation cavity 45.

In an exemplary embodiment, the fourth frame 44 is disposed with a first bump 51 on one side facing the light guide plate 10, wherein a position of the first bump 51 corresponds to a position of the groove 31 on the light guide plate 10, and a shape and a geometric dimension of the first bump 51 are basically the same as those of the groove 31 on the light guide plate 10, so when the light guide plate 10 is disposed within the accommodation cavity 45 of the mold frame 40, the first bump 51 is disposed within the groove 31 of the light guide plate 10, and an outer surface of the first bump 51 fits well a groove wall of the groove 31.

In an exemplary embodiment, the fourth frame 44 is disposed with at least one accommodation recess 53 on one side facing the light guide plate 10, wherein a position and a shape of the accommodation recess 53 correspond to those of the light emitting diode 20 fixed on the light guide plate 10, and a geometric dimension of the accommodation recess 53 may be larger than that of the light emitting diode 20, so when the light guide plate 10 is disposed within the accommodation cavity 45 of the mold frame 40, the light emitting diode 20 fixed on the light guide plate 10 is disposed within the accommodation recess 53 opened on the fourth frame 44.

In an exemplary embodiment, two ends of the fourth frame 44, i.e., a junction between the fourth frame 44 and the first frame 41 and a junction between the fourth frame 44 and the third frame 43 are both disposed with a second bump 52, wherein positions of the second bumps 52 correspond to those of the chamfering structures 32 on the light guide plate 10, and a shape and a geometric dimension of the second bumps 52 are basically the same as those of the chamfering structures 32 on the light guide plate 10, so when the light guide plate 10 is disposed within the accommodation cavity 45 of the mold frame 40, the second bump 52 is matched with the chamfer structure 32, and an outer surface of the second bump 52 fits well a wedge-shaped surface of the chamfer structure 32.

In an exemplary embodiment, well matching between the first bump 51 and the groove 31 and well matching between the second bump 52 and the chamfer structure 32 may make the first bump 51 and the second bump 52 reflect lights incident, by the light guide plate 10, on the mold frame 40 back to the light guide plate 10, thus improving utilization efficiency of the lights.

In an exemplary embodiment, polishing treatment may be performed on outer surfaces of the first bump 51 and the second bump 52 facing the light guide plate 10 to form polished reflecting surfaces, so as to increase quantity of reflected lights, improve light emitting brightness of the light guide plate and improve light emitting quality of the back light unit.

In an exemplary embodiment, the first bump 51 has a first bump surface parallel to a first surface of the light guide plate 10 and a second bump surface parallel to a second surface of the light guide plate 10, wherein the first bump surface and/or the second bump surface may be disposed with corresponding hollow cavities to reduce weight of the mold frame 40. Accordingly, a corresponding surface of the second bump 52 may also be disposed with a corresponding hollow cavity.

In an exemplary embodiment, if a material of the mold frame is a light absorbing material (such as a black mold frame), a surface of a groove on the light guide plate and a wedge-shaped surface of a chamfer structure may be treated as reflective surfaces, such as coating white ink or attaching a reflective sheet to increase amount of reflected lights. If the material of the mold frame is a reflective material (such as a white mold frame), reflection treatment may not be performed on the surface of the groove on the light guide plate and the wedge-shaped surface of the chamfer structure.

Figure 19:
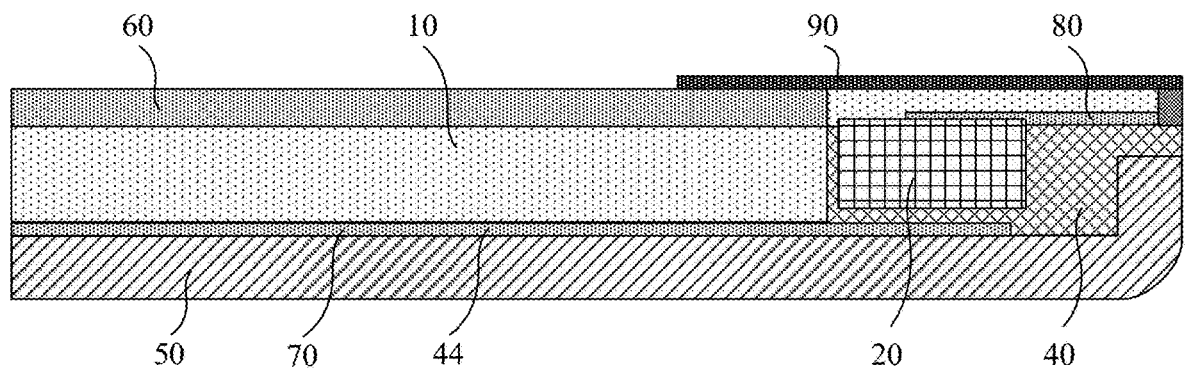
FIG. 19 is a schematic diagram of a structure of still another back light unit according to an embodiment of the present disclosure.

FIG. 19 is a schematic diagram of a structure of still another back light unit according to an embodiment of the present disclosure. A main body of the back light unit according to the embodiment of the present disclosure includes a light guide plate 10, light emitting diodes 20, a mold frame 40, a back plate 50 and an optical film set 60. As shown in FIG. 19, the back plate 50 includes a bottom plate and a side wall positioned at an edge of the bottom plate and perpendicular to the bottom plate. The bottom plate is disposed with a reflective film 70, the light guide plate 10 is disposed on the reflective film 70, and the optical film set 60 is disposed on the light guide plate 10. An outer side of a frame of the mold frame 40 is disposed on the side wall of the back plate 50, and an accommodation cavity at inner sides of the frame accommodates the light guide plate 10. The light emitting diode 20 is fixed on one side of the light guide plate 10 and connected to a flexible printed circuit (FPC) 80. In an exemplary embodiment, the back light unit further includes a light shielding layer 90, wherein the light shielding layer 90 is disposed around the back light unit. In an exemplary embodiment, the optical film set 60 may include a diffusion film disposed on the light guide plate 10, a lower bright enhancement film disposed on the diffusion film and an upper bright enhancement film disposed on the lower bright enhancement film.

It can be seen from the structure of the back light unit in the embodiment of the present disclosure that in the embodiment of the present disclosure, a groove is disposed on the light entrance surface of the light guide plate to form a reflective surface protruding toward the light guide plate, so that the lights incident on the reflective surface are totally reflected, the transmission direction of the lights are changed, brightness of the light guide plate area between adjacent LEDs is improved, uneven distribution of light intensity between the light guide plate area between the adjacent LEDs and the light guide plate area directly opposite to LEDs is reduced, forming of dark areas in a visible area of the light guide plate is avoided, overall light emitting uniformity of the light guide plate is improved, optical quality of the back light unit is improved, and quality of display pictures is ensured.

In order to avoid the problem of the dark area, at present, a structure adopts a solution of reducing the distance between adjacent LEDs and increasing a quantity of LEDs, but this solution not only causes cost increase of the back light unit, but also causes power consumption increase of the back light unit. In the solution of disposing the groove on the light entrance surface of the light guide plate proposed in the embodiment of the present disclosure, through the groove structure, brightness of the light guide plate area between adjacent LEDs is improved, forming of dark areas is avoided, which can ensure that on the premise of reducing uneven light intensity distribution between the light guide plate area between adjacent LEDs and the light guide plate area directly opposite to the LEDs, the distance between adjacent LEDs can be appropriately increased, and the quantity of LEDs can be reduced, which not only reduces cost of the back light unit, but also can reduce power consumption of the back light unit, improving product competitiveness.

In order to avoid the problem of the dark area, at present, another structure adopts a solution of increasing a distance between LEDs and the visible area of the light guide plate, but this solution increases a frame on the LED side of the back light unit, which leads to increase of non-display area, and is not beneficial to realization of narrow frame and does not conform to the market design trend. In the solution of disposing the groove on the light entrance surface of the light guide plate proposed in the embodiment of the present disclosure, through the groove structure, brightness of the light guide plate area between adjacent LEDs is improved, forming of dark areas is avoided, which can ensure that on the premise of reducing uneven light intensity distribution between the light guide plate area between adjacent LEDs and the light guide plate area directly opposite to the LEDs, a distance between LEDs and the visible area of the light guide plate can be appropriately reduced, so that the non-display area can be reduced, and a dimension of the frame on an LED side in the back light unit can be reduced, which is beneficial to realizing narrow frame, and improving product competitiveness.

The back light unit of the embodiment of the present disclosure has advantages such as simple structure, convenient assembly, simple manufacturing process, low production cost or the like, and has a good application prospect.

Based on the technical concept of the aforementioned technical solution, an embodiment of the present disclosure also provides a display device, which includes any one or more back light units of the aforementioned embodiments. The display device may include any one or more of: any product or component with a display function such as a mobile phone, a notebook computer, a tablet computer, a television, a digital photo frame, a vehicle-mounted display, a navigator, etc. Since the display device includes any of the back light units mentioned above, same technical effects may be achieved, which will not be described in detail here.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the description of the present disclosure, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. Those of ordinary skills in the art can understand the specific meanings of the above mentioned terms in the present disclosure according to specific context.

Although the embodiments disclosed in the present disclosure are as described above, the described contents are only the embodiments for facilitating understanding of the present disclosure, which are not intended to limit the present disclosure. A person skilled in the art to which the present disclosure pertains may make any modifications and variations in the form and details of implementation without departing from the spirit and scope of the present disclosure. Nevertheless, the scope of patent protection of the present disclosure shall still be determined by the scope defined by the appended claims.

What is claimed is:

1. A back light unit, comprising: a light guide plate and a plurality of light emitting diodes, wherein
   the plurality of light emitting diodes are disposed on a light entrance surface of a side end of the light guide plate, the light entrance surface of the light guide plate is disposed with at least one groove, and the at least one groove is disposed between at least part of adjacent light emitting diodes,
   wherein the back light unit further comprises a mold frame, wherein a first bump and an accommodation recess are disposed on a frame of the mold frame corresponding to the light entrance surface, the first bump is disposed within the groove of the light guide plate, and the light emitting diode is disposed within the accommodation recess, and
   wherein the frame is further disposed with a second bump, wherein a position of the second bump corresponds to that of a chamfer structure on the light guide plate, and when the light guide plate is disposed within an accommodation cavity of the mold frame, the second bump is matched with the chamfer structure, and an outer surface of the second bump fits a wedge-shaped surface of the chamfer structure.

2. The back light unit of claim 1, wherein in a direction parallel to a light exit surface of the light guide plate, a cross-sectional shape of the groove comprises any one or more of the following: an arc, a triangle or a trapezoid.

3. The back light unit of claim 2, wherein when the cross-sectional shape of the groove is the triangle, two sides of the triangle comprise any one or more of the following: a straight line, a polyline, or an arc line.

4. The back light unit of claim 2, wherein when the cross-sectional shape of the groove is the trapezoid,
   two sides of the trapezoid comprise any one or more of the following: a straight line, a polyline, or an arc line; and
   an upper bottom of the trapezoid adjacent to a visible area side of the light guide plate comprises any one or more of the following: a straight line, a polyline, or an arc line.

5. The back light unit of claim 2, wherein the cross-sectional shape of the groove is the arc, a radius of the arc is 3.5 mm to 4.5 mm, and at a junction between the arc and the light entrance surface, an included angle between a tangent of the arc and the light entrance surface is 40 degrees to 60 degrees.

6. The back light unit of claim 5, wherein the radius of the arc is 4.11 mm.

7. The back light unit of claim 5, wherein the included angle between the tangent of the arc and the light entrance surface is 45 degrees.

8. The back light unit of claim 2, wherein the cross-sectional shape of the groove is the triangle or the trapezoid, and an included angle between a side of the triangle or the trapezoid and the light entrance surface is 40 degrees to 60 degrees.

9. The back light unit of claim 1, wherein along an extending direction of the light entrance surface of the light guide plate, a width of the groove is 5 mm to 6 mm; along an extending direction of the light entrance surface of the light guide plate toward a visible area of the light guide plate, a depth of the groove is 0.5 mm to 1.5 mm, and a distance between a center line of the groove and a center line of a light emitting diode adjacent to the groove is 3 mm to 6 mm.

10. The back light unit of claim 9, wherein when a cross-sectional shape of the groove is an arc, the width of the groove is 5.49 mm, the depth of the groove is 1.05 mm, and the distance between the center line of the groove and the center line of the light emitting diode adjacent to the groove is 5 mm.

11. The back light unit of claim 1, wherein a plurality of microstructures are disposed on a groove wall of the at least one groove, wherein the plurality of microstructures comprise micro grooves recessed toward a visual area of the light guide plate and/or micro protrusions protruding away from the visual area of the light guide plate.

12. The back light unit of claim 11, wherein in a direction parallel to a light exit surface of the light guide plate, cross-sectional shapes of the micro grooves and/or the micro protrusions comprise any one or more of the following: an arc, a triangle, or a trapezoid, a depth of the micro grooves or a height of the micro protrusions is 10 μm to 100 μm, and an arrangement cycle is 50 μm to 400 μm.

13. The back light unit of claim 1, wherein a chamfer structure is further disposed between the light entrance surface of the light guide plate and a side end face of the light guide plate adjacent to the light entrance surface, wherein a first end of the chamfer structure is connected with the light entrance surface, and a second end of the chamfer structure is connected with the side end face of the light guide plate adjacent to the light entrance surface, a wedge-shaped surface is formed between the light entrance surface and the side end face.

14. The back light unit of claim 13, wherein in a direction parallel to the light exit surface of the light guide plate, a cross-sectional shape of the wedge-shaped surface comprises any one or more of the following: a straight line, a polyline, and an arc line.

15. The back light unit of claim 13, wherein the light guide plate is disposed with at least two chamfer structures, wherein at least one chamfer structure is disposed at a first end of the light entrance surface away from the plurality of light emitting diodes, and at least one chamfer structure is disposed at a second end of the light entrance surface away from the plurality of light emitting diodes.

16. The back light unit of claim 1, further comprising a back plate and an optical film set, wherein,
the back plate comprises a bottom plate and a side wall positioned at an edge of the bottom plate and perpendicular to the bottom plate, the bottom plate is disposed with a reflective film, and the light guide plate is disposed on the reflective film; and
the optical film set is disposed on light guide plate, and the optical film set comprises a diffusion film disposed on the light guide plate, a lower bright enhancement film disposed on the diffusion film and an upper bright enhancement film disposed on the lower bright enhancement film.

17. The back light unit of claim 1, wherein an outer surface of the first bump facing a visible area of the light guide plate is a polished surface.

18. A display device, comprising a back light unit, wherein the back light unit comprises a light guide plate and a plurality of light emitting diodes, wherein
the plurality of light emitting diodes are disposed on a light entrance surface of a side end of the light guide plate, the light entrance surface of the light guide plate is disposed with at least one groove, and the at least one groove is disposed between at least part of adjacent light emitting diodes,
wherein the back light unit further comprises a mold frame, wherein a first bump and an accommodation recess are disposed on a frame of the mold frame corresponding to the light entrance surface, the first bump is disposed within the groove of the light guide plate, and the light emitting diode is disposed within the accommodation recess, and
wherein the frame is further disposed with a second bump, wherein a position of the second bump corresponds to that of a chamfer structure on the light guide plate, and when the light guide plate is disposed within an accommodation cavity of the mold frame, the second bump is matched with the chamfer structure, and an outer surface of the second bump fits a wedge-shaped surface of the chamfer structure.

* * * * *